Patented Oct. 10, 1939

2,175,339

UNITED STATES PATENT OFFICE 2,175,339

PREPARATION OF CYCLIC COMPOUNDS FROM VINYL ACETYLENES

Albert S. Carter, Wilmington, Del., assignor to E. I. du Pont de Nemours & Company, Wilmington, Del., a corporation of Delaware No Drawing. Application June 29, 1937, Serial No. 150,941

24 Claims. (Cl. 260—280)

This invention relates to reactions of vinylacetylenes, more particularly it relates to the preparation of basic nitrogenous compounds by the reaction of vinylacetylenes with ammonia and amines, still more particularly it relates to the catalytic vapor phase condensation of vinylacetylenes with ammonia and volatile primary amines to produce basic nitrogenous compounds, particularly heterocyclic bases.

Numerous inventors have recited methods for the combination of acetylene and ammonia or amines in the vapor phase to produce basic nitrogenous compounds and nitriles, particularly the latter. Catalysts, methods of operation, and numerous types of products are described and well known to the art. When operation is maintained under conditions favoring the maximum production of basic condensates and a minimum of nitriles, complex mixtures of amines and heterocyclic bases result.

In the application of this synthesis, as described in the prior art, heterocyclic bases varying in molecular weight from pyrrol and pyridine to high boiling polynuclear compounds are disclosed. Little selectivity is found in the nature of the products; thus in the fraction of material boiling in the range of the picolines, the alpha-, beta- and gamma-picolines all may be found. In view of the fact that the unit carbon compound from which these are derived, namely, acetylene, contains only two carbon atoms, several molecules of the hydrocarbon are required in the evolution of a single molecule of the heterocyclic compound. In view of this fact, these several molecules may associate themselves in numerous ways and give rise to a number of isomeric compounds. In the formation of the picolines, three molecules of acetylene, at least, are required. Depending upon the manner in which they arrange themselves about the nitrogen during reaction, the methyl side-chain may be found in the 2-, 3-, or 4-position. Likewise, in the formation of the higher derivatives, greater complexity may exist.

Further, since the condensation between molecules is accompanied frequently by dehydrogenation, prolonged reaction periods are found to give increasing quantities of nitriles.

This invention has as an object a process which will produce basic nitrogenous compounds of a simple type without too high a percentage of undesirable by-products. A further object is to produce alpha-picoline free from beta-picoline and gamma-picoline. A still further object is the development of new and useful processes wherein vinylacetylenes may be employed as raw materials.

With these objects in view, it has been discovered that the reactions of vinylacetylenes with ammonia give rise to reactions of a simpler order than that of acetylene with ammonia. This is likewise true of vinylacetylenes with volatile primary amines. The reactions of monovinylacetylenes are less complex than those of acetylene, and, in turn, the reactions of divinylacetylene are less complex than those of monovinylacetylene. Reactions of the higher vinylacetylenes are somewhat more complex than those of divinylacetylene. These results are believed to follow from the fact that the vinylacetylenes possess longer chains of equivalent unsaturation and therefore may complete the condensation to heterocyclic compounds without involving as great a number of molecules. It is further observed that the formation of nitriles is very slight when working with vinylacetylenes, probably because a shorter active reaction period is required.

The application of this discovery of the reaction of vinylacetylenes with ammonia or amines, amounts to carrying out the first stages of the condensation, namely the polymerization of the acetylene molecules, in a separate system under controlled conditions. It is not intended to state that the polymerization of acetylene to vinylacetylenes precedes the condensation with ammonia in the synthesis of heterocyclic compounds from acetylene, for it is known that this is not always the case, as is proved by the fact that the intermediate amines may be isolated. But it is desired to call attention to the fact that in the use of vinylacetylenes, the phase of the reaction involving carbon to carbon condensation is carried out under controlled conditions giving products of fixed constitution which may combine with ammonia in a limited number of ways and with lower energy change.

The following exampe describes a typical operation. It is to be understood, however, that this exampe is merely for the purpose of illustration and that the invention is not limited to the specific features therein described.

Example 670 gms. of $Pb(NO_3)_2$ and 670 gms. of $Cd(NO_3)_2.4H_2O$ were dissolved in a minimum volume of boiling water and added to 3880 gms. of alumina. This was evaporated to dryness with frequent stirring, the mass was then heated gently until the evolution of oxides of nitrogen was complete. 2.9 liters of the mass was then placed in an electrically heated tube and reduced under hydrogen to the metallic state, finally sweeping out the hydrogen with a stream of ammonia. With the temperature of the reactor held at 325° to 370° C., the flow of ammonia was adjusted to 2.5 to 3.0 moles per hour and divinylacetylene vapor was introduced at the rate of 0.8 mole per hour. The products from the reactor were collected in a −70° C. condenser and a small amount of non-condensable gas was burned in a small jet. At the end of the reaction, the product was refluxed to remove ammonia and then extracted with dilute hydrochloric acid. The acid insoluble portion, which represented approximately 25% of the divinylacetylene used, was mostly benzene. To isolate benzene, the acid insoluble portion was carefully added to cold sulfuric acid of 60 to 80% strength with agitation, thus dissolving or resinifying aliphatic unsaturated hydrocarbons. The resulting mixture was then steam distilled; and to obtain benzene of high purity, the mixture was fractionally distilled. The acid soluble portion was chilled with ice and made alkaline with solid caustic giving a crude nitrogenous base which was further purified by fractional distillation giving about 5% yield of aliphatic amines and the balance heterocyclic bases, mostly alpha-picoline with a small amount of collidine, etc.

In this and other experiments, it is a fact to be emphasized that no picoline other than alpha picoline was present in appreciable quantities.

The condensation may be carried out with ammonia or volatile primary amines in the vapor phase by any of the previously known catalysts for the acetylene ammonia condensation such as metallic cadmium, lead, zinc oxide, thorium oxide, in general, oxides of the metals of the first to sixth groups of the periodic table, particularly in combination with lead and cadmium metal. Such catalyst materials may be used in compressed pellets, or they may be carried on such materials as charcoal, coke, silica gel or alumina gel. A particularly effective catalyst, and hence a preferred form, consists of one part metallic cadmium and about 1.7 to 2 parts lead reduced in a stream of hydrogen from the nitrates on about 16 to 20 parts of an alumina or silica carrier.

Any vinylacetylene structure, such as hydrocarbon compounds containing the group

is suitable for the purpose of this invention, and especially hydrocarbons of the group of non-benzenoid polymerizable polymers of acetylene, such as prepared by the processes of U. S. Patents 1,811,959; 1,926,055 and 1,926,056; and 2,048,838 consisting of monovinylacetylene

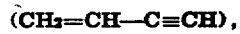

divinylacetylene $(CH_2=CH-C\equiv C-CH=CH_2)$, 1,3-hexadiene-5-yne

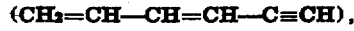

and 1,3,7-octatriene-5-yne

The reactions of vinylacetylenes containing six carbon atoms are less complex than those of the other vinylacetylenes and hence divinylacetylene and 1,3-hexadiene-5-yne are preferred where a large yield of alpha picoline is desired.

It is within the scope of the invention to use a mixture of vinylacetylenes. For example, the crude product obtained by polymerizing acetylene by the process of any of the above designated patents may be directly used in this invention without separating the acetylene polymers thereby produced.

The reactions of the vinylacetylene may be carried out with ammonia or with volatile primary amines, all with good results. Where primary amines are used which are not gases at the temperature of the reaction, the vinylacetylene gas may be passed through the liquid amine and the vapor of the latter is thereby entrained according to the well known gas law known as Dalton's Law of Partial Pressures. This procedure can be used with any primary amine which has a vapor pressure equal to two thirds or more of the total pressure on the system at the temperature at which the gas mixture is formed. Any primary amine satisfying this necessary condition comes within the scope of the term volatile primary amine. The mixed products from these reactions have uses which will be discussed later. When, however, it is desired to produce the least complex reaction products, the preferred procedure is to react vinylacetylenes and especially divinylacetylene or 1,3-hexadiene-5-yne with ammonia. Where the process is carried out principally for the production of alpha-picoline, it has been found that the reaction between ammonia and divinylacetylene or 1,3-hexadiene-5-yne is the most satisfactory and is hence preferred.

The temperature of the reaction should usually be over 200° C.; generally the catalysts are activated between 200° and 520° C., and maximum yields of heterocyclic compounds of low molecular weight are obtained between 275° and 400° C.

Ammonia or volatile primary amine is used in excess to prevent thermal decomposition of the acetylene compound. Inert gases may also be added, such as water vapor, the gases of the zero group of the periodic table, or nitrogen. Where water vapor is used, the water vapor assists in keeping the catalyst clean, thus prolonging its life. A favorable proportion is one volume of gaseous acetylenic compound to three volumes of ammonia, though proportions as low as one to two and as high as one to five have been used. Where inert gases are added, the amount of ammonia or amine can be reduced by the amount of inert gas added. The volume of ammonia or amine should not be reduced below that of the vinylacetylene. The total flow rate should be approximately 5 to 100 liters of gas per hour per liter of catalyst, measured at ordinary temperature and pressure, depending upon the activity of the catalyst and concentration of hydrocarbon. Thus, with a mixture of one part vinylacetylene gas to three of ammonia, the flow rate of the vinylacetylene will be about 5 to 30 liters per hour per liter of catalyst.

The products of the herein described invention include unsaturated aliphatic amines, aromatic compounds and heterocyclic bases. Insofar as is at present known the most important product is alpha-picoline which can be produced in good yield substantially free of the impurities which usually accompany this compound. Alpha-picoline is the essential raw material for the preparation of picolinic acid. This acid is a valuable intermediate in the preparation of rubber accelerators and numerous dyestuffs. The mixed nitrogenous products of the reactions have numerous uses and where these uses are contemplated, there is little preference as to the raw materials within the scope of the disclosure; i. e., other vinylacetylenes may be used in place of divinylacetylene and volatile primary amines may be used in place of ammonia without materially affecting the usefulness of the product. In general, the products of this invention find utility wherever heterocyclic nitrogenous compounds may be used, particularly in the synthesis of rubber accelerators, dyestuffs and insecticides.

It will be noted from the above example that aromatic compounds, particularly benzene, are obtained from the process and this is an important part of the invention because it is the first time that vinylacetylenes have been converted into aromatic compounds, thus divinylacetylene has been converted into its aromatic isomer, benzene. It should be noted that ammonia or the amines do not play an active part in the formation of benzene from divinylacetylene. This is probably a simple ring-closure of one $C_8H_6$ isomer to produce the aromatic compound of the same empirical formula. Ammonia serves as a diluent to prevent thermal decomposition of divinylacetylene and minimize polymerization, otherwise ammonia is without action insofar as the benzene formation is concerned. Therefore, where it is desirable to obtain benzene without simultaneous formation of heterocyclic nitrogenous compounds, nitrogen or any other inert gas, such as $CO_2$ and gases of group zero of the periodic table, may be substituted for the ammonia or volatile primary amines. It is believed that contact with iron or iron oxide as well as the catalysts for the formation of heterocyclic compounds, assists in the formation of benzene. While the formation of benzene has been discussed with reference to divinylacetylene, it is to be understood that this discussion is likewise applicable to 1,3-hexadiene-5-yne which is also an isomer of benzene.

The above description and specific example are to be construed as illustrative only and not as limiting the scope of the invention. Any modification or variation therefrom which conforms to the spirit of the invention is intended to be included within the scope of the claims.

I claim:

1. A catalytic vapor phase condensation process which comprises passing a non-benzenoid polymerizable polymer of acetylene and gas selected from the group consisting of ammonia and volatile primary amines over acetylene ammonia condensation catalyst at an elevated temperature.

2. A catalytic vapor phase condensation process which comprises passing a vinylacetylene in the gaseous phase of the group consisting of monovinylacetylene, divinylacetylene, 1,3-hexadiene-5-yne and 1,3,7-octatriene-5-yne together with a gas selected from the group consisting of ammonia and volatile primary amines over acetylene ammonia condensation catalyst at an elevated temperature.

3. A catalytic vapor phase condensation process which comprises passing a vinylacetylene of the group consisting of monovinylacetylene, divinylacetylene, 1,3-hexadiene-5-yne and 1,3,7-octatriene-5-yne together with a gas of the group consisting of ammonia and volatile primary amines over a catalyst comprising at least one member of the group consisting of metallic lead and metallic cadmium, in a reaction zone maintained at a temperature of at least 200° C. and collecting the reaction products in a condensing zone.

4. A catalytic vapor phase condensation process which comprises reacting a vinylacetylene of the group consisting of monovinylacetylene, divinylacetylene, 1,3-hexadiene-5-yne and 1,3,7-octatriene-5-yne with a gas of the group consisting of ammonia and volatile primary amines in the presence of a freshly prepared catalyst comprising at least one member of the group consisting of metallic lead and metallic cadmium and a supplemental catalyst, the reaction zone being maintained at a temperature of between 200° and 520° C., by introducing the vinylacetylene and the other gas into the reaction zone in the volume ratio of between 1/2 and 1/5, collecting the reaction products in a condensing zone and separating crude nitrogenous bases from the condensate.

5. A catalytic vapor phase condensation process which comprises reacting a vinylacetylene of the group consisting of monovinylacetylene, divinylacetylene, 1,3-hexadiene-5-yne and 1,3,7-octatriene-5-yne with a gas of the group consisting of ammonia and volatile primary amines in the presence of a freshly prepared catalyst consisting of 1 part metallic lead and about 1.7 to 2 parts metallic cadmium on about 16 to 20 parts of a carrier selected from the group consisting of alumina and silica, in a reaction zone, maintained at about a temperature of between 275° and 400° C. by introducing the vinylacetylene and the other gas into the reaction zone in the volume ratio of between 1/2 and 1/5, the total gas flow rate being in the range of 5 to 100 liters of gas per hour per liter of catalyst, collecting the reaction products in a condensing zone and extracting crude nitrogenous bases from the condensate with dilute acid.

6. A catalytic vapor phase condensation process which comprises reacting a vinylacetylene of the group consisting of monovinylacetylene, divinylacetylene, 1,3-hexadiene-5-yne and 1,3,7-octatriene-5-yne with a gas of the group consisting of ammonia and volatile primary amines in the presence of a freshly prepared catalyst consisting of 1 part metallic lead and about 1.7 to 2 parts metallic cadmium on about 16 to 20 parts of a carrier selected from the group consisting of alumina and silica, in a reaction zone maintained at about a temperature of between 325° and 370° C. by introducing the vinylacetylene and the other gas into the reaction zone in about the volume ratio of 1/3, the total gas flow rate being in the range of 5 to 30 liters of gas per hour per liter of catalyst, collecting the reaction products in a condensing zone at −70° C., refluxing the condensate to remove ammonia, extracting with dilute hydrochloric acid, chilling the acid insoluble portion, and making it alkaline with solid caustic to obtain crude nitrogenous bases.

7. The process of producing a condensation product of divinylacetylene and ammonia which comprises passing divinylacetylene vapor and ammonia over acetylene ammonia condensation catalyst at an elevated temperature.

8. A catalytic vapor phase condensation process which comprises passing divinylacetylene and ammonia over a catalyst comprising at least one member of the group consisting of metallic lead and metallic cadmium in a reaction zone maintained at a temperature of at least 200° C. and collecting the reaction products in a condensing zone.

9. A catalytic vapor phase condensation process which comprises reacting divinylacetylene with ammonia, in the presence of a freshly prepared catalyst comprising at least one member of the group consisting of metallic lead and metallic cadmium and a supplemental catalyst selected from the group consisting of oxides of metals of the first to sixth groups of the periodic table, the reaction zone being maintained at a temperature of between 200° and 520° C., by introducing divinylacetylene vapor and ammonia into the reaction zone in the volume ratio of between 1/2 and 1/5, collecting the reaction products in a condensing zone and separating crude nitrogenous bases from the condensate.

10. A catalytic vapor phase condensation process which comprises reacting divinylacetylene with ammonia, in the presence of a freshly prepared catalyst consisting of 1 part metallic lead and about 1.7 to 2 parts metallic cadmium on about 16 to 20 parts of a carrier selected from the group consisting of alumina and silica, in a reaction zone maintained at about a temperature of between 275° and 400° C. by introducing divinylacetylene vapor and ammonia, into the reaction zone in the volume ratio of between 1/2 and 1/5, the total gas flow rate being in the range of 5 to 100 liters of gas per hour per liter of catalyst, collecting the reaction products in a condensing zone and extracting crude nitrogenous bases from the condensate with dilute acid.

11. A catalytic vapor phase condensation process which comprises reacting divinylacetylene with ammonia, in the presence of a freshly prepared catalyst consisting of one part metallic lead and about 1.7 to 2 parts metallic cadmium on about 16 to 20 parts of a carrier selected from the group consisting of alumina and silica, in a reaction zone maintained at about a temperature of between 325° and 370° C. by introducing divinylacetylene vapor and ammonia into the reaction zone in about the volume ratio of 1/3, the total gas flow rate being in the range of 5 to 30 liters of gas per hour per liter of catalyst, collecting the reaction products in a condensing zone at −70° C., refluxing the condensate to remove ammonia, extracting with dilute hydrochloric acid, chilling the acid soluble portion, making it alkaline with solid caustic and purifying the crude nitrogenous base thus obtained by fractional distillation to produce alpha-picoline.

12. A catalytic vapor phase condensation process which comprises passing divinylacetylene, ammonia and an inert gas over a catalyst comprising at least one member of the group consisting of metallic lead and metallic cadmium and a metallic oxide, in a reaction zone maintained at a temperature of at least 200° C. and collecting the reaction products in a condensing zone.

13. A catalytic vapor phase condensation process which comprises reacting divinylacetylene with ammonia, in the presence of a freshly prepared catalyst consisting of one part metallic lead and about 1.7 to 2 parts metallic cadmium on about 16 to 20 parts of a carrier selected from the group consisting of alumina and silica, in a reaction zone maintained at a temperature of between 275° and 400° C. by introducing divinylacetylene and ammonia together with an inert gas into the reaction zone, the volume ratio of divinylacetylene to ammonia being not greater than unity, and the volume of ammonia and inert gas together being between 2 and 5 times as great as that of the divinylacetylene, the total gas flow rate being in the range of 5 to 100 liters of gas per hour per liter of catalyst, collecting the reaction products in a condensing zone and separating nitrogenous bases from the condensate.

14. A catalytic vapor phase condensation process which comprises introducing divinlyacetylene and ammonia into a reaction zone in the volume ratio of between 1 to 2 and 1 to 5, in the presence of a freshly prepared catalyst comprising at least one member of the group consisting of metallic lead and metallic cadmium, the reaction zone being maintained at a temperature of between 200° and 520° C., collecting the reaction products in a condensing zone and separating benzene from the condensate.

15. A catalytic vapor phase condensation process which comprises introducing divinylacetylene vapor and ammonia into a reaction zone in the volume ratio of between 1 to 2 and 1 to 5, the total gas flow rate being in the range of 5 to 100 liters of gas per hour per liter of catalyst, in the presence of a freshly prepared catalyst consisting of one part metallic lead and about 1.7 to 2 parts metallic cadmium on about 16 to 20 parts of a carrier selected from the group consisting of alumina and silica, the reaction zone being maintained at about a temperature of between 275° and 400° C., collecting the reaction products in a condensing zone, extracting with dilute acid and separating benzene from the acid insoluble portion of the condensate.

16. A catalytic vapor phase condensation process which comprises introducing divinylacetylene and ammonia together with an inert gas into a reaction zone, the volume ratio of divinylacetylene to ammonia being not greater than unity, and the volume of ammonia and inert gas together being between 2 and 5 times as great as that of the divinylacetylene, the total gas flow rate being in the range of 5 to 100 liters of gas per hour per liter of catalyst, in the presence of a freshly prepared catalyst consisting of one part metallic lead and about 1.7 to 2 parts metallic cadmium on about 16 to 20 parts of a carrier selected from the group consisting of alumina and silica, the reaction zone being maintained at about a temperature of between 275° and 400° C., collecting the reaction products in a condensing zone and separating benzene from the condensate.

17. A catalytic vapor phase condensation process which comprises passing divinylacetylene together with an inert gas in the volume ratio of between 1/2 and 1/5, over acetylene ammonia condensation catalyst at an elevated temperature.

18. A catalytic vapor phase condensation process which comprises passing divinylacetylene and an inert gas over a catalyst of metallic lead and metallic cadmium on a carrier selected from the group consisting of alumina and silica in a reaction zone maintained at a temperature of between 200° and 520° C., collecting the reaction products in a condensing zone and purifying the crude benzene thus obtained by fractional distillation.

19. A process of producing a condensation product of 1,3-hexadiene-5-yne and ammonia which comprises passing 1,3-hexadiene-5-yne and ammonia over acetylene ammonia condensation catalyst at an elevated temperature.

20. A catalytic vapor phase condensation process which comprises passing 1,3-hexadiene-5-yne and ammonia over a catalyst comprising at least one member of the group consisting of metallic lead and metallic cadmium, in a reaction zone maintained at a temperature of at least 21. A catalytic vapor phase condensation process which comprises reacting 1,3-hexadiene-5-yne with ammonia in the presence of a freshly prepared catalyst consisting of metallic lead and metallic cadmium on a carrier selected from the group consisting of alumina and silica, the reaction zone being maintained at a temperature of between 200° and 520° C., by introducing 1,3-hexadiene-5-yne vapor and ammonia into the reaction zone in the volume ratio of between 1/2 and 1/5, collecting the reaction products in a condensing zone and separating crude nitrogenous bases from the condensate.

22. A catalytic vapor phase condensation process which comprises passing 1,3-hexadiene-5-yne together with an inert gas in the volume ratio of between 1/2 to 1/5 over acetylene ammonia condensation catalyst at an elevated temperature.

23. A catalytic vapor phase condensation process which comprises passing a non-benzenoid polymerizable polymer of acetylene, a gas selected from the group consisting of ammonia and volatile primary amines and an inert gas over an acetylene ammonia condensation catalyst at an elevated temperature.

24. A catalytic vapor phase condensation process which comprises passing a non-benzenoid polymerizable polymer of acetylene, a gas selected from the group consisting of ammonia and volatile primary amines and an inert gas over a catalyst comprising at least one member of the group consisting of metallic lead and metallic cadmium in a reaction zone maintained at a temperature of at least 200° C.

ALBERT S. CARTER.

CERTIFICATE OF CORRECTION.

Patent No. 2,175,339.    October 10, 1939.

ALBERT S. CARTER.

It is hereby certified that error appears in the printed specification of the above numbered patent requiring correction as follows: Page 1, second column, lines 43 and 45, for "exampe" read example; page 3, second column, line 12, claim 4, after "catalyst" and before the comma, insert selected from the group consisting of oxides of metals of the 1st and 6th groups of the periodic table; page 4, first column, lines 55 and 56, claim 12, strike out "and a metallic oxide"; and that the said Letters Patent should be read with this correction therein that the same may conform to the record of the case in the Patent Office.

Signed and sealed this 5th day of December, A. D. 1939.

Henry Van Arsdale,
Acting Commissioner of Patents.

(Seal)

CERTIFICATE OF CORRECTION.

Patent No. 2,175,339.    October 10, 1939.

ALBERT S. CARTER.

It is hereby certified that in line 5 of Certificate of correction issued December 5, 1939, in the above numbered patent, the expression "1st and 6th" is erroneous and should read 1st to 6th; so that the said Certificate may conform to the record of the case in the Patent Office.

Signed and sealed this 2nd day of January, A. D. 1940.

Henry Van Arsdale,
Acting Commissioner of Patents.

(Seal)

2,175,339

21. A catalytic vapor phase condensation process which comprises reacting 1,3-hexadiene-5-yne with ammonia in the presence of a freshly prepared catalyst consisting of metallic lead and metallic cadmium on a carrier selected from the group consisting of alumina and silica, the reaction zone being maintained at a temperature of between 200° and 520° C., by introducing 1,3-hexadiene-5-yne vapor and ammonia into the reaction zone in the volume ratio of between 1/2 and 1/5, collecting the reaction products in a condensing zone and separating crude nitrogenous bases from the condensate.

22. A catalytic vapor phase condensation process which comprises passing 1,3-hexadiene-5-yne together with an inert gas in the volume ratio of between 1/2 to 1/5 over acetylene ammonia condensation catalyst at an elevated temperature.

23. A catalytic vapor phase condensation process which comprises passing a non-benzenoid polymerizable polymer of acetylene, a gas selected from the group consisting of ammonia and volatile primary amines and an inert gas over an acetylene ammonia condensation catalyst at an elevated temperature.

24. A catalytic vapor phase condensation process which comprises passing a non-benzenoid polymerizable polymer of acetylene, a gas selected from the group consisting of ammonia and volatile primary amines and an inert gas over a catalyst comprising at least one member of the group consisting of metallic lead and metallic cadmium in a reaction zone maintained at a temperature of at least 200° C.

ALBERT S. CARTER.

---

CERTIFICATE OF CORRECTION.

Patent No. 2,175,339.          October 10, 1939.

ALBERT S. CARTER.

It is hereby certified that error appears in the printed specification of the above numbered patent requiring correction as follows: Page 1, second column, lines 43 and 45, for "exampe" read example; page 3, second column, line 12, claim 4, after "catalyst" and before the comma, insert selected from the group consisting of oxides of metals of the 1st and 6th groups of the periodic table; page 4, first column, lines 55 and 56, claim 12, strike out "and a metallic oxide"; and that the said Letters Patent should be read with this correction therein that the same may conform to the record of the case in the Patent Office.

Signed and sealed this 5th day of December, A. D. 1939.

Henry Van Arsdale,
Acting Commissioner of Patents.

(Seal)

---

CERTIFICATE OF CORRECTION.

Patent No. 2,175,339.          October 10, 1939.

ALBERT S. CARTER.

It is hereby certified that in line 5 of Certificate of correction issued December 5, 1939, in the above numbered patent, the expression "1st and 6th" is erroneous and should read 1st to 6th; so that the said Certificate may conform to the record of the case in the Patent Office.

Signed and sealed this 2nd day of January, A. D. 1940.

Henry Van Arsdale,
Acting Commissioner of Patents.

(Seal)

CERTIFICATE OF CORRECTION.

Patent No. 2,175,339. October 10, 1939.

ALBERT S. CARTER.

It is hereby certified that in line 5 of Certificate of correction issued December 5, 1939, in the above numbered patent, the expression "1st and 6th" is erroneous and should read 1st to 6th; so that the said Certificate may conform to the record of the case in the Patent Office.

Signed and sealed this 2nd day of January, A. D. 1940.

(Seal)

Henry Van Arsdale,
Acting Commissioner of Patents.